E. N. CHANDLER.
ELECTRICALLY HEATED IMPLEMENT.
APPLICATION FILED DEC. 17, 1914.

1,192,389.

Patented July 25, 1916.

Witnesses:
James R. Hodder
R. G. Hersey

Inventor:
Edwin N. Chandler,
by Geo. H. Maxwell
Atty.

UNITED STATES PATENT OFFICE.

EDWIN N. CHANDLER, OF BRAINTREE, MASSACHUSETTS.

ELECTRICALLY-HEATED IMPLEMENT.

1,192,389.   Specification of Letters Patent.   Patented July 25, 1916.

Application filed December 17, 1914. Serial No. 877,633.

*To all whom it may concern:*

Be it known that I, EDWIN N. CHANDLER, a citizen of the United States, and resident of Braintree, county of Norfolk, State of Massachusetts, have invented an Improvement in Electrically-Heated Implements, of which the following description, in connection with the accompanying drawings, is a specification, like letters on the drawings representing like parts.

My present invention relates to an electrically heated device, preferably capable of having a plurality of removable operating tools fitted therein, and is of special value in painting, glazing, carpentering, scraping, and the like, or in many lines where heat facilitates the work. Such a heated tool is particularly valuable in painters' and scrapers' work, as well as in carpenter work of various kinds. In such lines a continually heated tool for finishing, smoothing, scraping or burning off old varnish, paint, and the like, is a distinct novelty in the art and it is this field to which my present invention is directed.

I provide a handle and a metallic member fitted to receive an electrical heating unit, which metallic member is provided with means to receive, hold, and heat the particular tool which it is desired to work with, for example, a scraping knife, fluting iron, putty knife, burnishing knife or the like, and to be fitted to receive any one of a plurality of such knives, each being readily attached and detached and held firmly and heated uniformly during use.

In my copending application Serial No. 865,471 filed October 7, 1914, I illustrate a form of electrically heated shoe ironing apparatus, and I may advantageously employ a similar type of handle and electrical heating unit in my present invention, the heating unit portion being so constructed and arranged as to hold and heat the removable implement.

Figure 1:
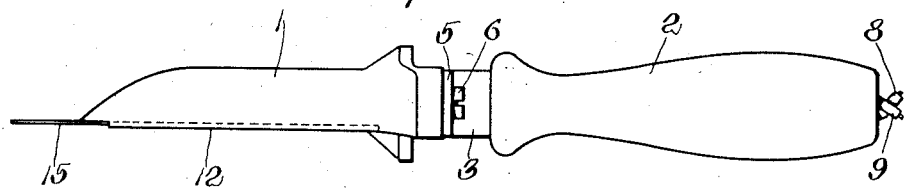
Figure 2:
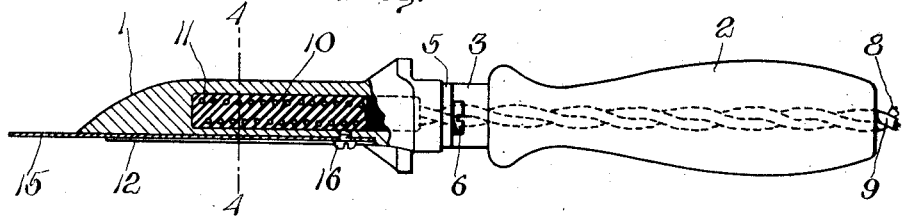
Figure 3:
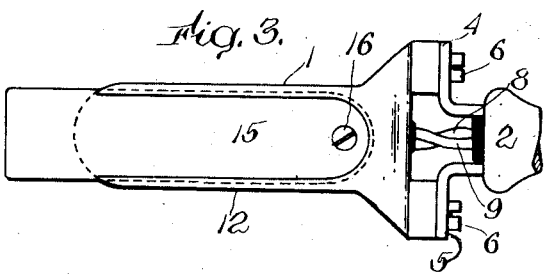
Figure 4:
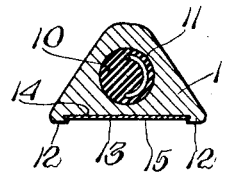
Figure 5:
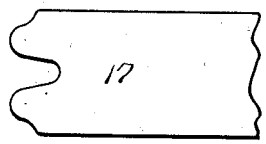
Figure 6:
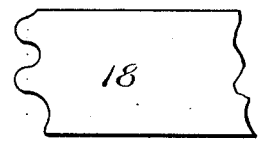
Figure 7:
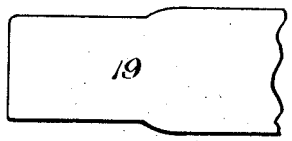
Figure 8:
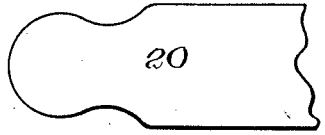

Referring to the drawings, Figure 1 is a side view of my novel form of electrically heated implement; Fig. 2 is a view with a portion of the heating unit, metallic member and implement shown in cross section; Fig. 3 is a bottom plan view of the implement and holding portion; Fig. 4 is a cross sectional view on the line 4—4 of Fig. 2; and Figs. 5, 6, 7, and 8 are fragmentary views of different forms of removable implements.

The metallic member 1 and a wooden handle portion 2 are arranged to be united by a metallic member 3 carried by the handle portion 2, and having side wings 4 and 5 receiving headed bolts 6 which are screwed into tapped sockets in the metallic portion 1, as clearly illustrated in Figs. 1, 2, and 3. The handle 2 is hollowed to receive and conduct the electrical current supply wires 8 and 9, which wires are connected with a heating unit 10 lodged within a recess 11 in the metallic portion 1. Removing the bolts 6 permits the handle 2 and heating unit to be withdrawn from the member 1, when it is desired to renew the heating unit, or for convenience in transportation, as well as in assembling, the parts 1 and 2 being thus capable of shipment independently of the heating unit and electrical connector wires, and being quickly assembled by the user.

The metallic member 1 is preferably made of triangular form in cross section, as shown in Fig. 4, with one face provided with a dove-tailed edge portion 12 extending sufficiently to enable the flat knife or tool 13 to be slid underneath the dove-tailed rim 12 and be seated firmly on the face 14 adjacent the heating unit 10. Such a tool in the form of a putty knife 15 is shown in Figs. 1, 2, 3, and 4. The knife 15 is provided with an aperture to receive a retaining screw 16 which is threaded into a tapped recess in the face 14 of the member 1 and may be located at the rear of the face 14, as shown in the drawings.

With the implement assembled, the knife 15 in place, and current supplied through the wires 8 and 9 to the heating unit 10, the metal portion 1 is quickly heated and the tool 15 similarly maintained in a heated state substantially throughout its entire length and also as far as the outer or working end. The operator may, with this heated implement, perform a large number of different lines of work, much quicker and better than heretofore, such as removing varnish, paint, and the like, burnishing furniture, desks, woodwork, finish, etc. Furthermore, this work is performed without the addition of gas or flame burners, heretofore necessary, and without not only the danger of fire, but also that of damaging the work as well as requiring an extra operator. Furthermore, the heating tool is maintained at a uniform temperature which can be regulated by a rheostat to just the best heat for the particular work in hand.

The tool 15 may be instantly removed and another tool 17, 18, 19, or 20, substituted therefor, which tool may be made to fit a particular molding, fluting, finish, or the like which is to be operated upon.

The facility with which my improved electrically heated tool can be employed, in many lines of work, will be readily appreciated by those skilled in their respective arts, and as I believe this is a distinct novelty, I wish to claim the same broadly. The metallic portion 1 supplies the heat and maintains and distributes it over substantially the entire surface of the tool held thereby, as well as carrying the heat supply well up to the actual edge or end, where the tool contacts with the work, while the handle portion 2, preferably of wood or other non-heat conducting material, enables the operator to manipulate the instrument with ease and comfort, even when a high degree of heat is supplied. I find that the heated implement, having a yielding blade is of particular usefulness in many lines of shoe work, such as repairing patent leather shoes, toe tips, and the like, the heated and yielding blade acting to melt the patent leather enamel, shoe repairing wax, or the like, and aid in flowing, smoothing and burnishing the leather during such work. Also this heated blade may be utilized as a shoe ironing apparatus as explained in my said co-pending application.

Having described my invention, what I claim as new and desire to secure by Letters Patent is:

An electrically heated hand tool of the kind described, comprising a metallic body portion cored to receive a removable heating unit, and having a tool recess on the outer surface of said body portion, tool retaining flanges overhanging a portion of the recess, a removable tool fitted within said recess and under said flanges, in combination with a handle, and connecting means between said handle and the cored body portion to insulate the handle therefrom.

In testimony whereof, I have signed my name to this specification, in the presence of two subscribing witnesses.

EDWIN N. CHANDLER.

Witnesses:
JAMES R. HODDER,
R. G. HERSEY.